United States Patent
Strom et al.

(10) Patent No.: US 7,280,315 B1
(45) Date of Patent: Oct. 9, 2007

(54) PASSIVE COMPENSATION FOR POLE TIP PROTRUSION BY SLIDER BENDING

(75) Inventors: Brian Strom, Cupertino, CA (US); Douglas Krajnovich, Santa Clara, CA (US); Kaz Saito, San Jose, CA (US); Timothy Riener, Fremont, CA (US)

(73) Assignee: Maxtor Corporation, Scotts Valley, CA (US)

( * ) Notice: Subject to any disclaimer, the term of this patent is extended or adjusted under 35 U.S.C. 154(b) by 349 days.

(21) Appl. No.: 10/968,718

(22) Filed: Oct. 19, 2004

Related U.S. Application Data (60) Provisional application No. 60/514,328, filed on Oct. 24, 2003.

(51) Int. Cl.
*G11B 5/60* (2006.01)

(52) U.S. Cl. .................. 360/234.6; 360/245.3

(58) Field of Classification Search ..... 360/245–245.7, 360/234.6, 294.7, 246.4
See application file for complete search history.

(56) References Cited

U.S. PATENT DOCUMENTS 5,936,806 A * 8/1999 Pan et al. ................ 360/234.6
6,747,848 B2 * 6/2004 Kasajima et al. ........ 360/245.3
6,940,694 B2 * 9/2005 Ohwe et al. ............. 360/234.6

* cited by examiner

Primary Examiner—A. J. Heinz (57) ABSTRACT

A disk drive includes a storage disk, a suspension and a slider assembly. The slider assembly includes a trailing half having a surface area, and a leading half having a substantially similar surface area to that of the trailing half. The percentage of the surface area of the trailing half that is directly secured to the suspension is greater than the percentage of the surface area of the leading half that is directly secured to the suspension. In another embodiment, the slider assembly includes a top surface that is secured to the suspension so that during an increase in temperature of the suspension only a portion of the top surface is subjected to a force that causes concavity of the slider assembly along a crown and/or a cross-crown direction. In yet another embodiment, the slider assembly is secured to the suspension so that a portion of the slider assembly cantilevers away from the suspension. In a further embodiment, the slider assembly has a leading edge and an opposing trailing edge. In this embodiment, the slider assembly is secured to the suspension so that an increase in temperature of the suspension causes more cross-crown concavity relative to the storage disk at the trailing edge than at the leading edge.

24 Claims, 7 Drawing Sheets

PASSIVE COMPENSATION FOR POLE TIP PROTRUSION BY SLIDER BENDING

RELATED APPLICATION

This application claims the benefit on U.S. Provisional Application Ser. No. 60/514,328 filed on Oct. 24, 2003. The contents of U.S. Provisional Application Ser. No. 60/514,328 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider assembly which has an air bearing surface, a leading edge, a trailing edge and a read/write head positioned near the trailing edge. The read/write head transfers information to and from the storage disk. Rotation of the storage disk causes the slider assembly to ride on an air-supported journal bearing (also referred to as an "air bearing") so that the read/write head is at a distance from the storage disk that is commonly referred to as a "head-to-disk spacing".

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data.

Maintaining a relatively small and consistent head-to-disk spacing is further complicated by other factors. In particular, the read/write head includes a write head having electrical conduction path(s), generally referred to as a "write element". During a write operation, the electrical resistance of the electrical circuitry in the write element generates heat in and around the read/write head. The extent and rate of heating depends upon a multiplicity of factors including but not limited to the level of current directed to the write element, the types of materials used in the construction of the write element, and the sizes and geometries of various features within the slider assembly. A temperature increase causes thermal expansion of portions of the slider assembly toward the storage disk, known as write pole tip protrusion ("WPTP"). In addition, environmental temperature increases within the disk drive that are independent of heating the write element and that act on a more global scale can also result in environmental pole tip protrusion ("EPTP") toward the storage disk. If pole tip protrusion is excessive, the slider assembly can unintentionally contact the storage disk ("head-to-disk contact"), causing off-track writing, degraded data transfer rates, damage to the slider assembly, damage to the storage disk and/or a permanent loss of data.

Conversely, a temperature decrease in the drive will induce the opposite effect on the EPTP—the pole tips will retract from the disk. Such retraction can degrade the performance of the reading and writing process since larger spacing can generally degrade the information transfer to and/or from the disk.

Moreover, in conventional disk drives, the slider assembly is typically formed from ceramic materials such as alumina titanium carbide ($Al_2O_3$—TiC), and can be secured to a suspension assembly that is typically formed from metal materials such as stainless steel. Environmental heat that is generated within the disk drive can cause thermal expansion of the suspension assembly, as well as the slider assembly. However, stainless steel has a coefficient of thermal expansion that is approximately 2.5 times greater than the coefficient of thermal expansion of $Al_2O_3$—TiC. Because of this disparity, thermal expansion of the stainless steel occurs to a greater extent than thermal expansion of the slider assembly. Consequently, concavity of the slider assembly often occurs in a direction from the leading edge to the trailing edge, also referred to herein as the "crown" direction as temperature within the disk drive increases. This concavity results in the trailing edge, and thus the read/write head, moving closer to the storage disk, further risking or actually causing unwanted head-to-disk contact. Further, if the temperature of the read/write head decreases, the opposite effect can occur, e.g. the slider crown moves in direction of being more convex (or at least less concave) and this increases head-to-disk spacing with potentially adverse implications, as indicated above.

SUMMARY

The present invention is directed to a disk drive that includes a rotatable storage disk, a suspension, and a slider assembly. In one embodiment, the slider assembly includes (i) a trailing half having a surface area and a read/write head that magnetically interacts with the storage disk, and (ii) a leading half having a surface area that is substantially similar to the surface area of the trailing half. In this embodiment, the percentage of the surface area of the trailing half that is directly secured to the suspension is greater than the percentage of the surface area of the leading half that is directly secured to the suspension.

In another embodiment, the slider assembly includes a top surface that is secured to the suspension so that during an increase in temperature of the suspension only a portion of the top surface of the slider assembly is subjected to a force that causes concavity of the slider assembly along a crown direction of the slider assembly. In yet another embodiment, the slider assembly is secured to the suspension so that a portion of the slider assembly cantilevers away from the suspension.

In a further embodiment, the slider assembly has a leading edge and an opposing trailing edge. In this embodiment, the slider assembly is secured to the suspension so that an increase in temperature of the suspension causes more concavity relative to the storage disk at the trailing edge than the leading edge of the slider assembly.

The present invention also includes a method for controlling a head-to-disk spacing in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
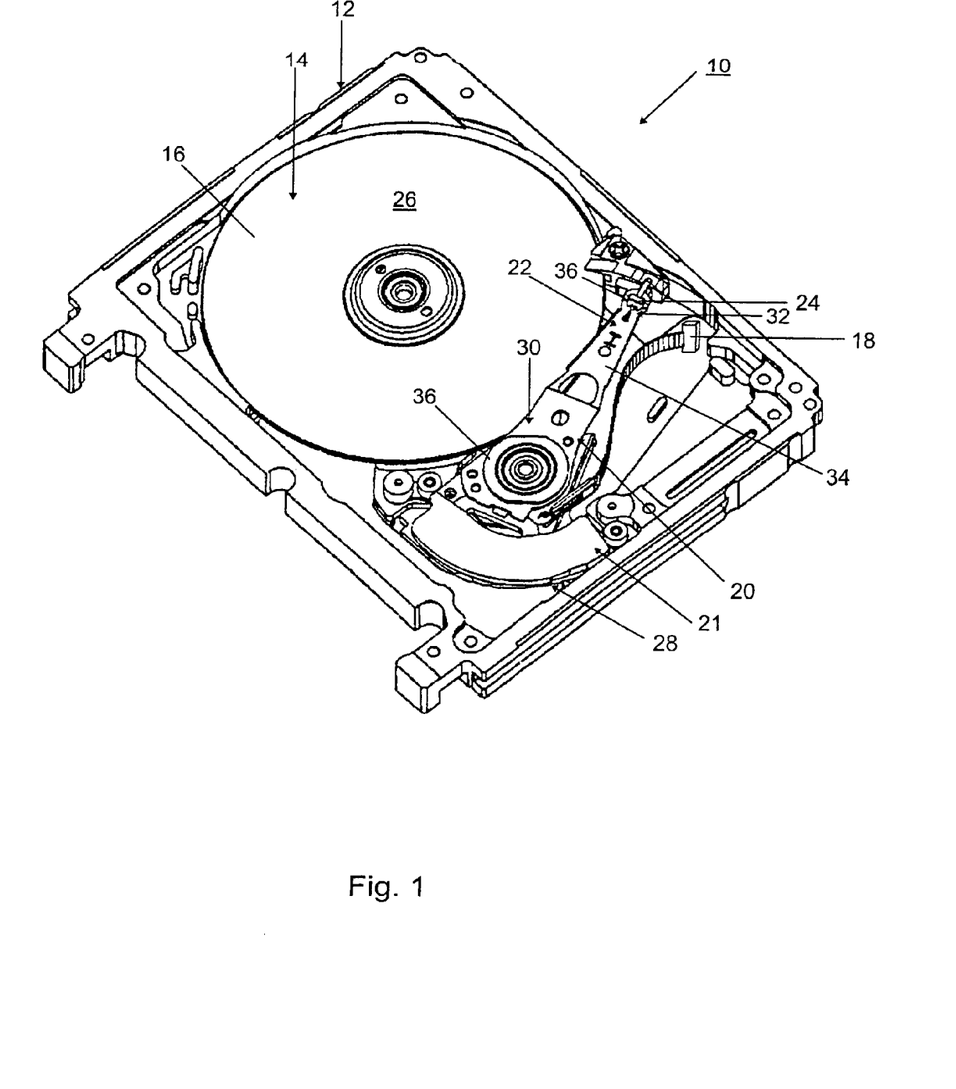
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, (iii) a drive circuitry 18, and (iv) a head stack assembly 20 including an actuator assembly 21 and one or more head suspension assemblies 22, with each head suspension assembly 22 including a slider assembly 24.

Each storage disk 16 includes one or more disk surfaces 26 that each has a plurality of concentric data tracks (not shown) that store data, including a target track. Further, the storage disk 16 can also include non-data tracks, such as servo tracks. Once the slider assembly 24 stabilizes over the target track, data is read from the storage disk 16 during a read operation and transferred to the storage disk 16 during a write operation. The drive circuitry 18 sends electrical current to and/or receives electrical signals from the slider assembly 24 during read and/or write operations.

The head stack assembly 20 illustrated in FIG. 1 includes an actuator motor 28, one head suspension assembly 22, and one actuator arm 30. The head suspension assembly 22 is secured to the actuator arm 30, and supports the slider assembly 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

Each head suspension assembly 22 includes the slider assembly 24 and a suspension 32 that supports the slider assembly 24. The suspension 32 includes a load beam 34 and a flexure 36. The load beam 34 attaches the flexure 36 and the slider assembly 24 to the actuator arm 30. Each load beam 34 can be flexible in a direction perpendicular to the storage disk 16 and can act as a spring for supporting the slider assembly 24. Typically, the load beam 34 is formed from a metallic material such as stainless steel or other suitable materials. In an alternative embodiment, the load beam 34 and the flexure 36 can be formed as an integral, unitary structure that can utilize homogeneous or non-homogeneous materials.

Each flexure 36 attaches the slider assembly 24 to the load beam 34. The flexure 36 is formed from a metallic material such as stainless steel or other suitable materials.

The slider assembly 24 transfers information between the drive circuitry 18 and the storage disk 16. The design of the slider assembly 24 can vary depending upon the requirements of the suspension assembly 22 and/or the disk drive 10. The composition of the slider assembly can vary. In one embodiment, portions of the slider assembly 24 can be formed from materials such as alumina titanium carbide ceramic, for example.

Figure 2A:
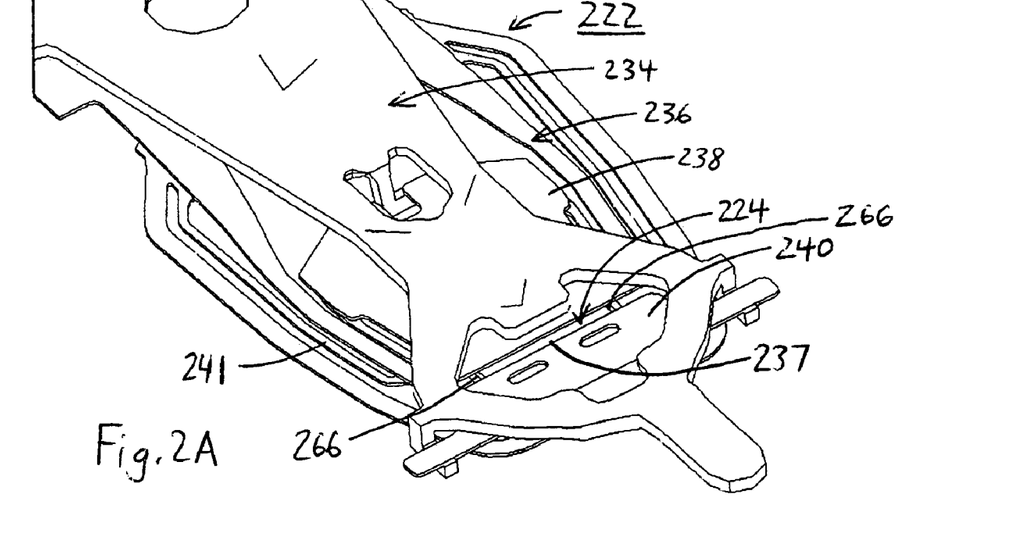
FIG. 2A is a top perspective view of an embodiment of a portion of a head suspension assembly and a slider assembly having features of the present invention.

FIG. 2A is a top perspective view of an embodiment of a portion of a suspension assembly 222 and a slider assembly 224 in accordance with the present invention. In this embodiment, the suspension assembly 222 includes a load beam 234 and a flexure 236 that is secured to the load beam 234. The slider assembly 224 is secured to the flexure 236. The slider assembly 224 includes a top surface 237 that generally faces away from the storage disk 16 (illustrated in FIG. 1), and a bottom surface 239 (illustrated in FIG. 2B) that generally faces the storage disk 16, and is opposite the top surface 237. The bottom surface 239 is also referred to herein as an "air bearing surface". Further, the slider assembly 224 can include one or more side surfaces 266.

In one embodiment, the flexure 236 can include one or more flexure regions. In the embodiment illustrated in FIG. 2A, the flexure 236 includes two spaced apart flexure regions including a proximal flexure region 238 and a distal flexure region 240. The configuration and positioning of the flexure regions 238, 240 can vary depending upon the design requirements of the slider assembly 224 and the disk drive 10. In this embodiment, the proximal flexure region 238 is positioned more proximate the actuator arm 30 (illustrated in FIG. 1) than the distal flexure region 240. In this embodiment, each of the flexure regions 238, 240 can be secured directly to the load beam 234 for support. Further, each of the flexure regions 238, 240 can directly or indirectly support or secure one or more conductors 241 that electrically connect the drive circuitry 18 (illustrated in FIG. 1) with the slider assembly 224 or other components that are supported by the suspension assembly 222.

Figure 2B:
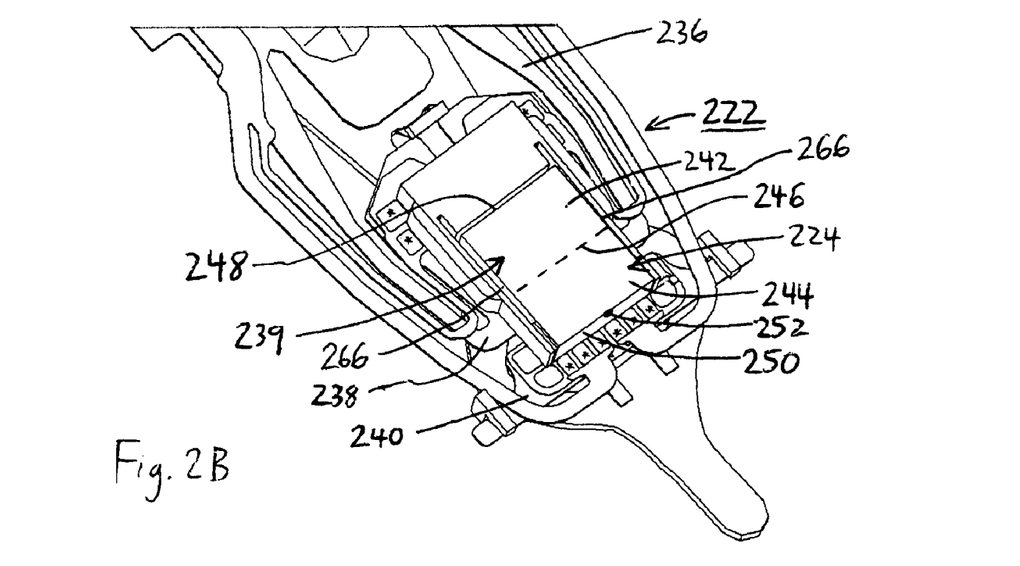
FIG. 2B is a bottom perspective view of the portion of the head suspension assembly and the slider assembly illustrated in FIG. 2A.

FIG. 2B is a bottom perspective view of the portion of the suspension assembly 222 and the slider assembly 224 illustrated in FIG. 2A. The slider assembly 224 includes a leading half 242 and a trailing half 244 (separated by midline 246). The leading half 242 of the slider assembly 224 has a leading edge 248, and the trailing half 244 of the slider assembly 224 has a trailing edge 250. Further, the trailing half 244 includes a read/write head 252 that is positioned near the trailing edge 250. As used herein, the leading half 242 and the trailing half 244 are defined to have substantially similar surface areas as one another.

In one embodiment, at least a portion of the top surface 237 (illustrated in FIG. 2A) and/or a portion of one or more side surfaces 266 of the trailing half 244 of the slider assembly 224 is/are directly secured to the flexure 236. More specifically, in the embodiment illustrated in FIG. 2B, at least a portion of the trailing half 244 is directly secured to the distal flexure region 240 of the flexure 236. In one such embodiment, the distal flexure region 240 is directly secured to a portion of the trailing half 244 that includes at least a portion of an intersection between (i) the top surface 237 of the trailing half 244 of the slider assembly 224, and (ii) the trailing edge 250 of the slider assembly 224. Moreover, in this embodiment, no portion of the slider assembly 224 is directly secured to the proximal flexure region 238.

Stated another way, a portion of the slider assembly 224 cantilevers from the distal flexure section 240 so that this cantilevered portion of the slider assembly 224 floats free without being directly secured to any part of the flexure 236, or any other structure, as set forth in greater detail below. In this embodiment, the cantilevered portion of the slider assembly 224 includes the leading half 242. In other words, in one embodiment, the top surface 237 of the leading half 242 of the slider assembly 224 is not directly secured to and/or does not directly contact any part of the flexure 236. However, in an alternative embodiment, at least a portion of the leading half 242 can contact a portion of the flexure 236 without such portion of the leading half 242 being secured to such portion of the flexure 236.

In non-exclusive alternative embodiments, at least approximately 10%, 25%, 50%, 75% or 100% of the trailing half 244 of the slider assembly 224 is secured to the distal flexure region 240, while zero percent of the leading half 242 is secured to the proximal flexure region 238 and/or the distal flexure region 240. In another embodiment, a portion of the leading half 242 is secured to the proximal flexure region 238 and/or the distal flexure region 240 of the flexure 236. For example, in non-exclusive alternative embodiments, less than approximately 90%, 75%, 50%, 25% or 10% of the leading half 242 is secured to at least one of the proximal flexure region 238 and the distal flexure region 240 of the flexure 236.

As provided below, these designs result in a greater extent of deformation or bending of the trailing edge 250 than the leading edge 248 of the slider assembly 224. Stated another way, because of the location(s) that the top surface 237 of the slider assembly 224 is secured to the flexure 236, and the disparity in the coefficients of thermal expansion of the materials used, the slider assembly 224 changes its shape asymmetrically as a function of temperature relative to the midline 246 that separates the leading half 242 and the trailing half 244, as explained in greater detail below.

In addition, the designs provided herein result in the flexure 236 having a greater influence on deformation of the slider assembly 224 in a side-to-side direction (also referred to herein as a "cross-crown" direction) than in a lengthwise direction (also referred to herein as a "crown" direction), as set forth below.

Figure 2C:
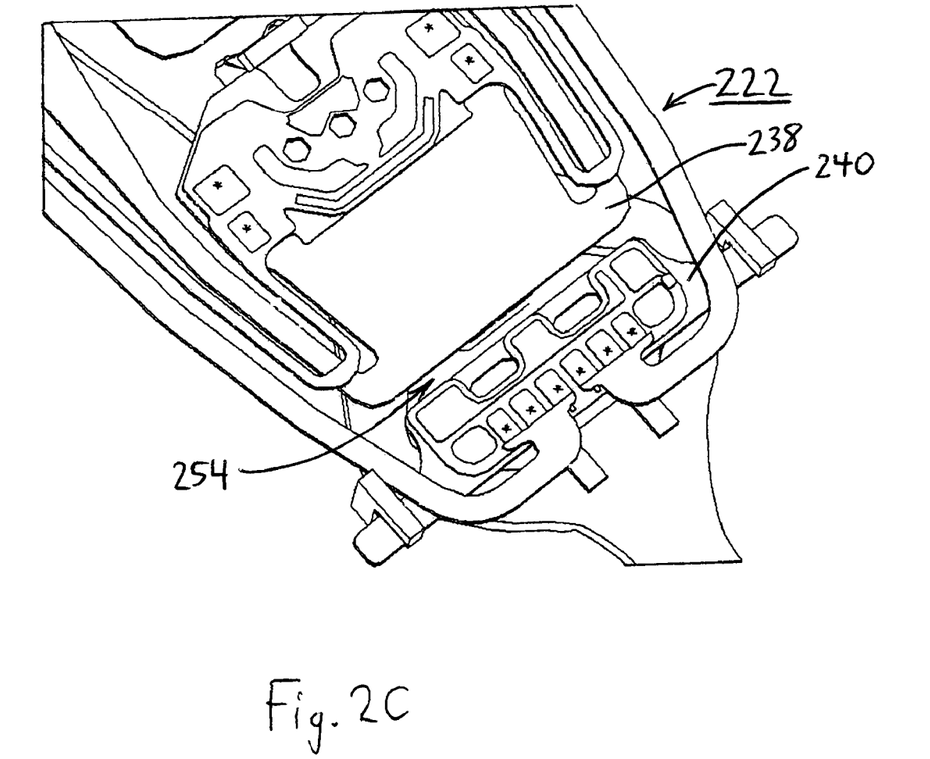
FIG. 2C is a bottom perspective view of the portion of the head suspension assembly illustrated in FIG. 2B, with the slider assembly and other components omitted for clarity.

FIG. 2C is a bottom perspective view of a portion of the suspension assembly 222, with the slider assembly 224 (illustrated in FIG. 2B) and various other components omitted for clarity. In the embodiment illustrated in FIG. 2C, a flexure gap 254 is present between the proximal flexure region 238 and the distal flexure region 240.

In an alternative embodiment, no flexure gap 254 exists between the proximal flexure region 238 and the distal flexure region 240, and these regions 238, 240 can be formed from a single unitary piece of material, such as stainless steel. In this embodiment, the proximal flexure region 238 and the distal flexure region 240 can be formed so that these regions 238, 240 are not coplanar. With this design, a portion of the slider assembly 224 can be secured to the distal flexure region 240 without being secured to the proximal flexure region 238, resulting in a portion of the slider assembly 224 cantilevering from the distal flexure region 240, consistent with the teachings provided herein.

Figure 3:
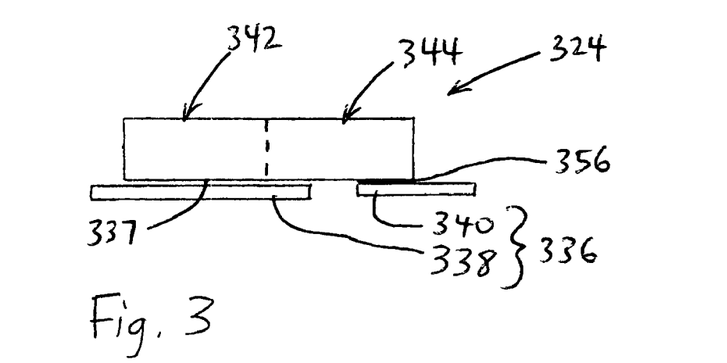
FIG. 3 is a simplified side view of one embodiment of a portion of the head suspension assembly and the slider assembly.

FIG. 3 is a simplified side view of a portion of a flexure 336 and a slider assembly 324 in accordance with the present invention. In this embodiment, the flexure 336 includes a proximal flexure region 338 and a distal flexure region 340. In the embodiment illustrated in FIG. 3, the trailing half 344 of the slider assembly 324 is secured to the distal flexure region 340, without the leading half 338 being secured to any region 338, 340 of the flexure 336. However, as provided above, the extent to which the slider assembly 324 is secured to the flexure 336 can be varied to achieve the desired bending characteristics of the slider assembly 324, as set forth herein.

In at least some of the embodiments provided herein, including but not limited to the embodiment illustrated in FIG. 3, the percentage of the surface area of the trailing half 344 that is directly secured to the flexure 336 is greater than the surface area of the leading half 342 that is directly secured to the flexure 336. In non-exclusive alternative embodiments, the surface area of the trailing half 344 that is directly secured to the flexure 336 is at least 10%, 25%, 50%, 75%, 100% or 200% greater than the surface area of the leading half 342 that is directly secured to the flexure 336.

Stated alternatively for some embodiments, the percentage of the surface area of the top surface 337 of the trailing half 344 that is directly secured to the flexure 336 is greater than the surface area of the top surface 337 of the leading half 342 that is directly secured to the flexure 336. In non-exclusive alternative embodiments, the surface area of the top surface 337 of the trailing half 344 that is directly secured to the flexure 336 is at least 10%, 25%, 50%, 75%, 100% or 200% greater than the surface area of the top surface 337 of the leading half 342 that is directly secured to the flexure 336.

Further, any suitable material for securing the slider assembly 324 to the flexure 336 can be used, such as materials known to those skilled in the art. As a non-exclusive example, an adhesive material 356 such as epoxy can be utilized in the present invention. As used herein, the use of an adhesive material 356, or any other means of securing a portion of the flexure 336 to a portion of the slider assembly 324 is included in the definition of being "directly secured". In other words, the term "directly secured" is contrasted with a portion of the slider assembly 324 that is either contacting or not contacting a portion of the flexure 336, but in any event is not fixedly secured to a portion of the flexure 336. For example, the leading half 342 of the slider assembly 324 is not directly secured to any portion of the flexure 336, as illustrated in FIG. 3. As a further example, the trailing half 344 of the slider assembly 324 is not directly secured to the proximal flexure region 338 of the flexure 336.

With the designs provided herein, because the leading half 342 of the slider assembly 324 is not secured to the flexure 336 (or secured to a lesser extent, in some embodiments), deformation of the leading half 342 caused by the temperature changes is less likely to occur than deformation of the trailing half 344. Additionally, because the leading half 342 experiences less movement due to temperature changes, less curvature change in the crown direction is likely to occur, as set forth in greater detail below.

Figures 4A, 4B:
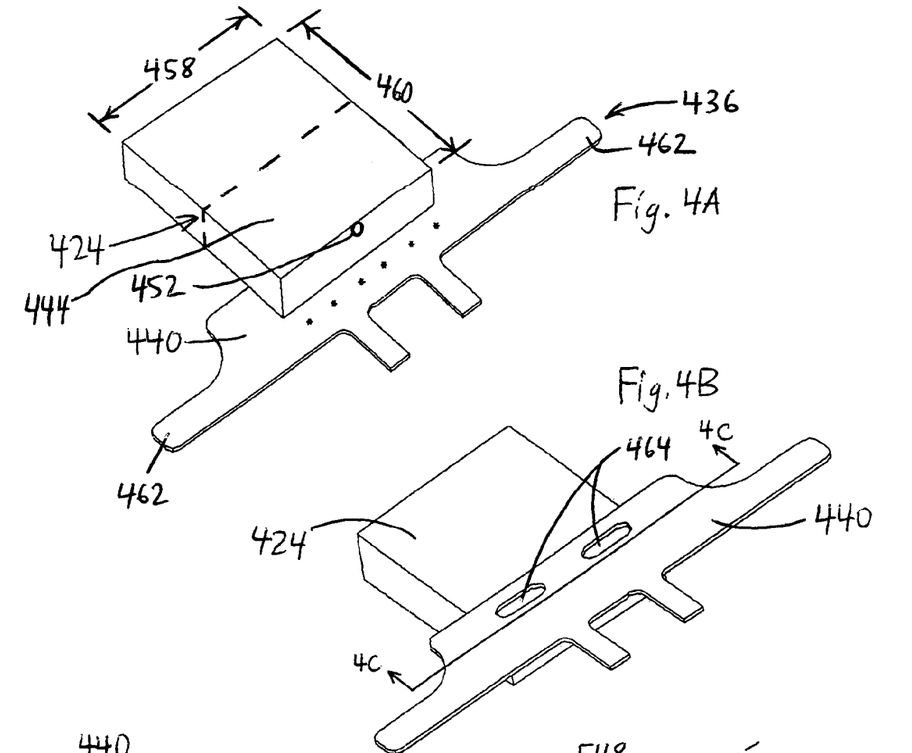
FIG. 4A is a bottom perspective view of an embodiment of a portion of the head suspension assembly and the slider assembly.
FIG. 4B is a top perspective view of the portion of the head suspension assembly and the slider assembly illustrated in FIG. 4B.

FIG. 4A is a bottom perspective view of an embodiment of a distal flexure region 440 of a flexure 436 and a slider assembly 424 in accordance with the present invention. The configuration and dimensions of the distal flexure region 440 can vary to suit the design requirements of the slider assembly 424 and the disk drive. For example, the overall footprint of the distal flexure region 440 can vary in order to support other structures such as conductors and the like. Further, the thickness of the distal flexure region 440 can vary depending upon the desired extent of deformation of the slider assembly 424, as described below.

In the embodiment illustrated in FIG. 4A, the distal flexure region 440 is secured to a portion of the trailing half 444 of the slider assembly 424 which includes the read/write head 452. The distal flexure region 440 extends across an entire width 458 of the slider assembly 424, e.g. the cross-crown direction. In an alternative embodiment, the distal flexure region 440 extends only partially across the width of the slider assembly 424.

Further, in this embodiment, the flexure 436 does not extend along an entire length 460 of the slider assembly 424, e.g. the crown direction, which is substantially perpendicular to the cross-crown direction. In the embodiment illustrated in FIG. 4A, the distal flexure region 440 extends less than approximately 20% along the length 460 of the slider assembly 424. In non-exclusive alternative embodiments, the distal flexure region 440 extends less than approximately 90%, 75%, 50%, 30% or 10% along the length 460 of the slider assembly 424.

Because the flexure 436 is secured to the slider assembly 424 along less than the entire length 460 of the slider assembly 424, at least a portion of the slider assembly 424 along the crown is not subjected to a force by the flexure 436 that causes deformation of the slider assembly 424 with an increase in temperature. By way of example, in one embodiment where the flexure 436 is directly secured to and extends approximately 30% along the length 460 of the slider assembly 424, approximately 70% of the length 460 of the slider assembly 424 is not directly secured to the flexure 436. Thus, in this embodiment, approximately 70% of the length of the slider assembly 424 is not subjected to deformation along the crown direction caused by a temperature increase of the flexure 436, and approximately 30% of the length of the slider assembly 424 is subjected to deformation along the crown direction caused by a temperature increase in the flexure 436. In alternative, non-exclusive embodiments, at least approximately 10, 20, 30, 40, 50, 60, 70, 80, or 90% of the length of the slider assembly 424 is not subjected to deformation along the crown direction.

The distal flexure region 440 can also include one or more flexure end tabs 462 that are supported by the load beam 234 (illustrated in FIG. 2A). In one embodiment, the flexure end tabs 462 are not adhered or otherwise secured to the load beam 234, but are merely supported. With this design, the distal flexure region 440 is allowed to thermally expand along its length, without being impeded due to adherence to the load beam 234. Alternatively, one or more of the flexure tabs end 462 can be adhered or otherwise secured to the load beam 234.

FIG. 4B is a top perspective view of the distal flexure region 440 and the slider assembly 424 illustrated in FIG. 4A. In this embodiment, the distal flexure region 440 can include one or more flexure apertures 464 that can improve bonding between the flexure 436 and the slider assembly 424, although the flexure apertures 464 are not a required element of the present invention.

Figures 4C, 5A:
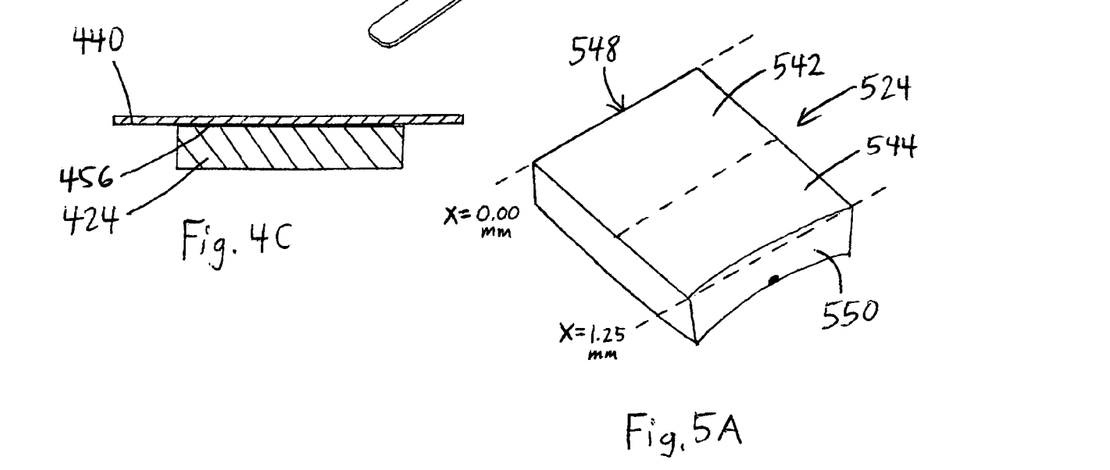
FIG. 4C is a cross-sectional view of the portion of the head suspension assembly and the slider assembly taken on line 4C-4C in FIG. 4B.
FIG. 5A is a perspective view of the slider assembly.

FIG. 4C is a cross-sectional view of the distal flexure region 440 and the slider assembly 424 taken at line 4C-4C in FIG. 4B. In this embodiment, the distal flexure region 440 is secured with an adhesive material 456. As provided above, the distal flexure region 440 has a higher coefficient of thermal expansion than the slider assembly 424. Thus, the distal flexure region 440 experiences greater expansion in the cross-crown direction than the slider assembly 424 with increased temperature. As a result of this greater degree of expansion, physics principles and experimentation support that the distal flexure region 440 causes a bowing or concavity of the slider assembly 424 in a cross-crown direction upon an increase in temperature.

FIG. 5A is a perspective view of a slider assembly 524 such as that illustrated in FIG. 4A. Among other components, the flexure 436 (illustrated in FIG. 4A) has been omitted for clarity. The slider assembly 524 illustrated in FIG. 5A is shown following a temperature increase at or near the slider assembly 524. Additionally, FIG. 5A is used in conjunction with the graphs shown in FIGS. 5B and 5C.

The leading edge 548 of the slider assembly 524 illustrated in FIG. 5A is set to X=0.00 mm. The trailing edge 550 of the slider assembly 524 is set to X=1.25 mm. It is recognized that the slider assembly 524 can be any suitable length that may be greater or less than 1.25 mm. Thus, the dimensions used for the slider assembly relative to FIGS. 5A-5C are provided as a representative example only, and are not intended to limit the scope of the present invention in any way.

Figure 5B:
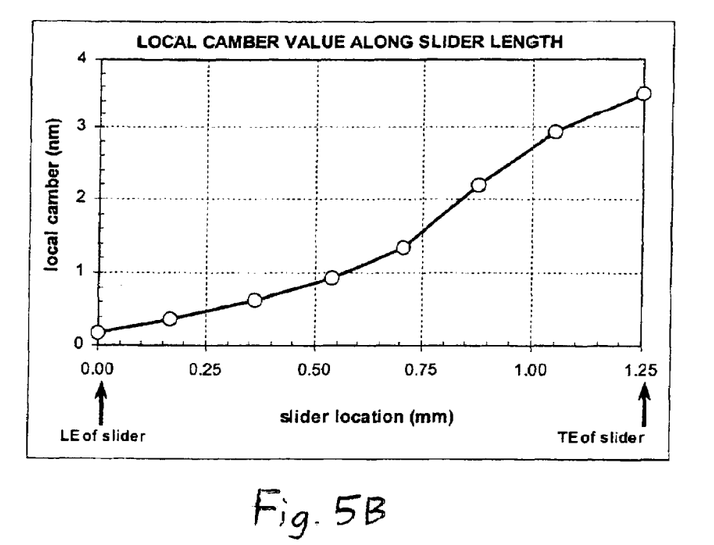
FIG. 5B is a graph of local deformation from a leading edge to a trailing edge along the length of the slider assembly.
Figure 5C:
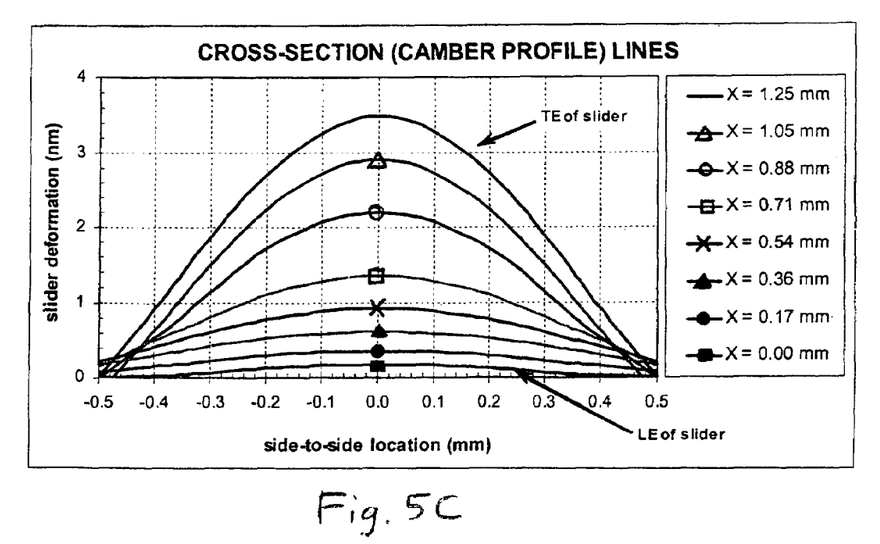
FIG. 5C is a graph of slider deformation along a plurality of cross-sections from the leading edge to the trailing edge.

FIG. 5B is a graph illustrating the degree of cross-crown concavity (also referred to herein as "concavity") at various points along the length of the slider assembly 524, based on finite element analysis. FIG. 5B shows that the degree of cross-crown concavity increases along the length of the slider assembly 524 from the leading edge 542 (X=0 mm) to the trailing edge 544 (X=1.25 mm). It is recognized that by simple structural mechanics, the concavity illustrated in FIG. 5A and graphically shown in FIGS. 5B and 5C occurs substantially equally on the top surface 337 (illustrated in FIG. 3) and the bottom surface 339 (illustrated in FIG. 3) of the slider assembly 524.

More specifically, FIG. 5B illustrates that the leading edge 548 is substantially linear, e.g., little or no concavity, because in this example, the leading half 542 of the slider assembly 524 is not secured to any part of the flexure. Therefore, the leading half 542 has not been directly subjected to influences due to the disparity in coefficients of thermal expansion between the flexure and the leading half 542 of the slider assembly 524. In contrast, the trailing edge 550 is directly secured to the flexure, and thus has been influenced by the disparity in coefficients of thermal expansion between the flexure and the trailing half 544 of the slider assembly 524.

Depending upon the thickness of the slider assembly 524, and the materials used to form the flexure 436 (illustrated in FIG. 4A) and/or the slider assembly 524, the extent of the cross-crown concavity and/or deformation differential between the leading edge 542 and the trailing edge 544 can vary. In one embodiment, at a 10 degree Celsius temperature increase of the flexure 436, the trailing edge 544 can exhibit at least approximately 1% greater deformation than the leading edge 542 that is due to the increased temperature of the flexure 436. In non-exclusive alternative embodiments, the trailing edge 544 can exhibit at least approximately 5%, 10%, 25%, 50%, 100%, 200%, 500% or 1,000% greater deformation than the leading edge 542 that is due to the increased temperature of the flexure 436.

FIG. 5C is a graph of slider deformation as a function of both the side-to-side location on the slider assembly 524, and the location between the leading edge 548 and the trailing edge 550, inclusive. FIG. 5C shows that at or near the leading edge 548, there is relatively little deformation of the slider assembly 524, regardless of side-to-side location. However, greater deformation is observed nearer the trailing edge 550. Further, the type of deformation is that of concavity, such that the read/write head 452 (illustrated in FIG. 4A) would move further away from the storage disk 16 (illustrated in FIG. 1) during higher-temperature operation of the disk drive 10.

Figures 6A, 6B:
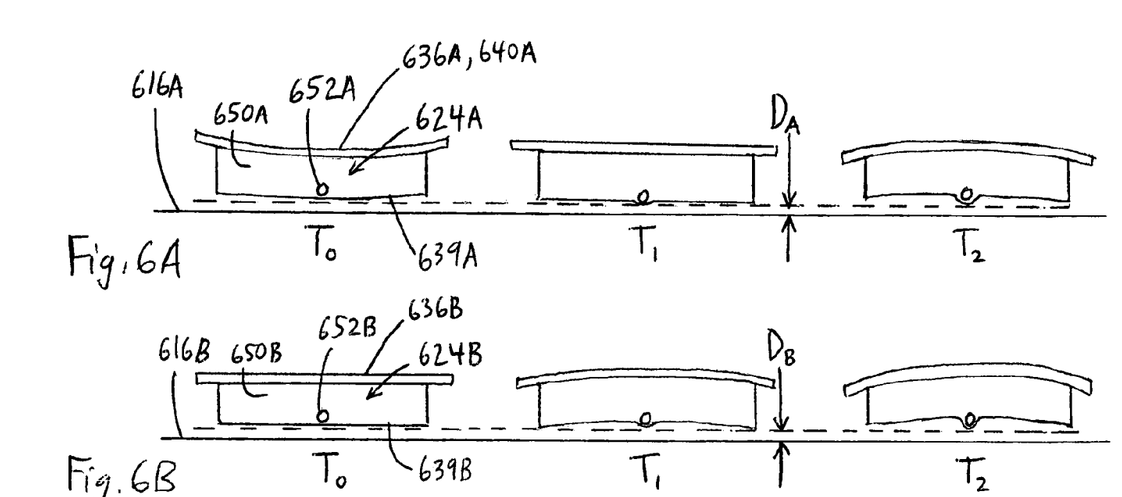
FIG. 6A is a simplified end view of one embodiment of the slider assembly including a read/write head under various operating conditions.
FIG. 6B is a simplified end view of another embodiment of the slider assembly including the read/write head under various operating conditions.
Figure 6C:
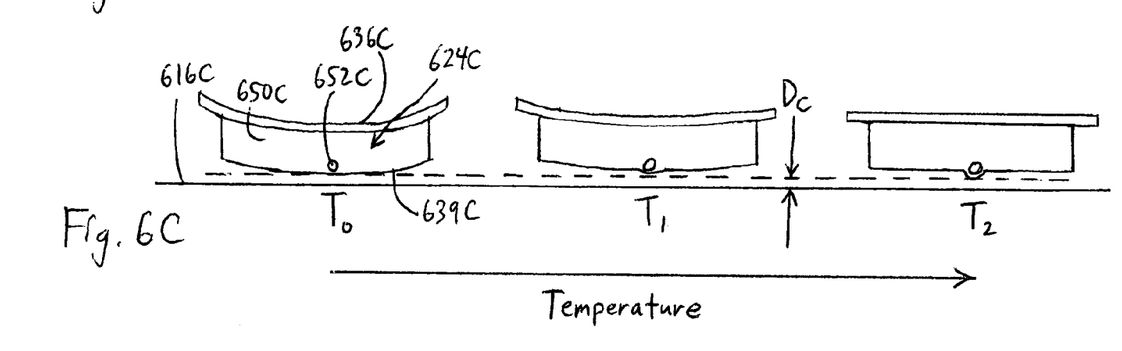
FIG. 6C is a simplified end view of yet another embodiment of the slider assembly including the read/write head under various operating conditions.

FIGS. 6A-6C illustrate sequences of temperature increases at or near the slider assembly 624A-C for three embodiments of the present invention. FIG. 6A shows deformation of the trailing edge 650A of the slider assembly 624A caused by the disparity in coefficients of thermal expansion between the slider assembly 624A and the distal flexure region 640A of the flexure 636A.

In the embodiment illustrated in FIG. 6A, at an initial cold temperature $T_0$, the flexure 636A and the slider assembly 624A can be secured together so that the air bearing surface 639A of the slider assembly 624A has a substantially convex configuration. At $T_0$, because the slider assembly 624A is basically "unheated", little or no thermal protrusion of the read/write head 652A occurs. With this design, the flexure 636A effectively positions the read/write head 652A at a distance $D_A$ from the storage disk 616A (also referred to herein as a "head-to-disk spacing").

At temperature $T_1$, after various operations begin to heat the slider assembly 624A and the flexure 636A, the disparity in coefficients of thermal expansion between the flexure 636A and the slider assembly 624A cause the air bearing surface 639A of the slider assembly 624A to become less convex, and more flat. Additionally, the increase in temperature causes thermal protrusion of the read/write head 652A to a somewhat limited extent, which approximately offsets the lack of convexity of the air bearing surface 639A of the slider assembly 624A. As a result, the read/write head 652A remains approximately at distance $D_A$.

At temperature $T_2$, after the slider assembly 624A and the flexure 636A have reached their peak operating temperatures, the disparity in coefficients of thermal expansion between the flexure 636A and the slider assembly 624A cause the air bearing surface 639A of the slider assembly 624A to become somewhat concave. Further, the additional increase in temperature causes thermal protrusion of the read/write head 652A to a greater extent, which approximately offsets the further change in shape of the air bearing surface 639A of the slider assembly 624A. Consequently, the read/write head 652A remains approximately at distance $D_A$. With this design, the combination of the flexure 636A and the slider assembly 624A passively control and maintain the distance between the read/write head 652A and the storage disk 616A, which improves performance of the disk drive.

The preceding embodiment can also be presented in the reverse and those skilled in the art will readily recognize the reciprocity of this logic. Instead of an increase in temperature above $T_0$ as discussed above, one can consider an example wherein the system starts at $T_0$ and the temperature is decreased. This will result in effects opposite to those discussed above. For example, the slider assembly 624A will be induced to bend in a more convex manner, which will force the read/write head 652A closer to the storage disk. At the same time, the decreased environmental temperature will cause the constituent elements of the read/write head 652A to retract, thus countering the effect of the convexly deforming slider assembly 624A.

The embodiments illustrated in FIGS. 6B and 6C show the flexure 636 and the slider assembly 624 at different initial positions at the cold temperature $T_0$. For example, in FIG. 6B, the read/write head 652B is positioned at a distance $D_B$ from the storage disk 616B. At temperature $T_1$, the disparity in coefficients of thermal expansion cause the air bearing surface 639B of the slider assembly 624B to become less flat, and more concave. Additionally, thermal protrusion of the read/write head 652B occurs to a somewhat limited extent, which approximately offsets the limited concavity of the air bearing surface 639B of the slider assembly 624B, thereby positioning the read/write head 652B approximately at distance $D_B$. At temperature $T_2$, the air bearing surface 639B of the slider assembly 624B becomes even more concave, while the thermal protrusion of the read/write head 652B approximately offsets the further change in shape of the air bearing surface 639B. Consequently, the read/write head 652B remains approximately at distance $D_B$.

In FIG. 6C, at temperature $T_0$, the air bearing surface 639C of the slider assembly 624C has a substantially convex configuration, while little or no thermal protrusion of the read/write head 652C occurs, maintaining the read/write head 652C at a distance $D_C$ from the storage disk 616C. At temperature $T_1$, thermal expansion between the flexure 636C and the slider assembly 624C cause the air bearing surface 639C of the slider assembly 624C to become somewhat less convex, while thermal protrusion of the read/write head 652C occurs to a somewhat limited extent, approximately offsetting the change in shape of the air bearing surface 639C of the slider assembly 624C. As a result, the read/write head 652C remains approximately at distance $D_C$. At temperature $T_2$, the air bearing surface 639C of the slider assembly 624C becomes substantially flat, while thermal protrusion of the read/write head 652C offsets the further change in shape of the air bearing surface 639C of the slider assembly 624C. Consequently, the read/write head 652C remains approximately at distance $D_C$.

With these designs, the combination of the flexure 636A-C and the slider assembly 624A-C passively control and maintain a relatively consistent distance $D_{A-C}$ between the read/write head 652A-C and the storage disk 616A-C, which improves performance of the disk drive. Stated another way, as the area at or near the slider assembly 624A-C heats up causing the read/write head 652A-C to protrude toward the storage disk 616A-C, the slider assembly 624A-C passively recedes in a cross-crown direction. Moreover, because a greater percentage of the attachment between the slider assembly 624A-C and the flexure 636A-C occurs at the trailing half of the slider assembly 624A-C, concavity in the crown direction, which would result in movement of the read/write head 652A-C toward the storage disk 616A-C, is inhibited even with increasing temperatures. Because concavity in the crown direction with an increase in temperature is inhibited, thermal protrusion of the read/write head 652A-C can be more easily offset with the cross-crown concavity that is provided with the present invention.

The reciprocity discussed previously, e.g., the equivalent but substantially opposite effects of decreasing versus increasing temperature, can also apply to FIGS. 6B and 6C below. For brevity, the extended discussions of the impact of decreasing temperature instead of increasing temperature as they relate to FIGS. 6B and 6C are omitted herein.

The types of materials used and the dimensions and/or configurations of the materials can be adjusted to better maintain a consistent spacing between the read/write head 652A-C and the storage disk 616A-C throughout a relatively wide range of operating temperatures.

Figure 7A:
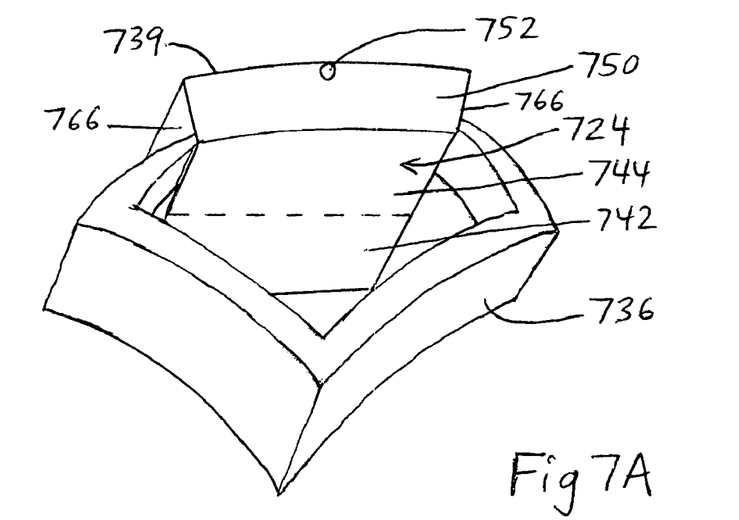
FIG. 7A is a perspective view of another embodiment of a portion of the head suspension assembly and the slider assembly having features of the present invention at a first temperature.
Figure 7B:
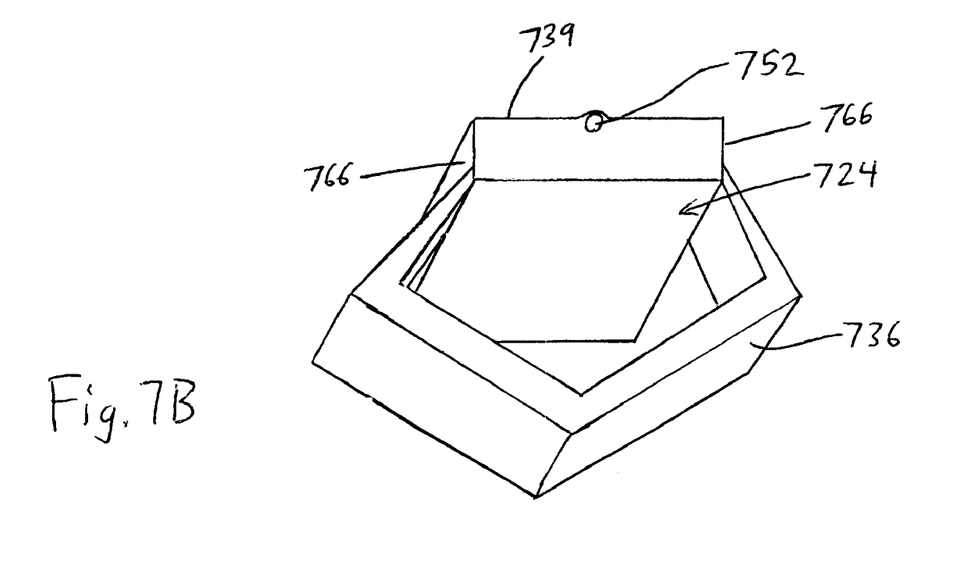
FIG. 7B is a perspective view of the head suspension assembly and the slider assembly illustrated in FIG. 7A at a second temperature.

FIGS. 7A-7B illustrate perspective views of an alternative embodiment of a portion of the flexure 736 and the slider assembly 724, under two different temperature conditions. In this embodiment, the attachment between the flexure 736 and the load beam 34 (illustrated in FIG. 1, for example) is omitted for clarity. However, the flexure 736 can be secured to the load beam 34 at any location along the structure of the flexure 736.

FIG. 7A shows the present invention at a first temperature, and FIG. 7B shows the present invention at a second temperature that is higher than the first temperature. As illustrated in FIG. 7A, the flexure 736 is secured to two of the side surfaces 766 of the slider assembly 724 toward the trailing edge 750 of the slider assembly 724. In one embodiment, the flexure 736 is secured only to the trailing half 744 of the slider assembly 724. However, as described previously with respect to other embodiments in accordance with the present invention, the positioning of the flexure 736 relative to the trailing half 744 and/or the leading half 742 of the slider assembly 724 can vary. In one non-exclusive alternative embodiment, the flexure 736 is secured to the two side surfaces 766 and also to the top surface 737 of the trailing half 744 of the slider assembly 724.

In the embodiment illustrated in FIG. 7A, the flexure 736 can be somewhat diamond shaped. However, this configuration is provided as an example only, and is not intended to limit the numerous other configurations of flexures 736 that can be utilized with the present invention. At the first temperature, the flexure 736 exerts a force onto the slider assembly 724 that causes the air bearing surface 739 to have a somewhat convex shape. The convex shape at this lower, first temperature effectively causes a decrease in the distance between the read/write head 752 and a storage disk 16 (illustrated in FIG. 1), even though the read/write head 752 may be exhibiting little or no thermal protrusion due to the lower temperature.

FIG. 7B shows that an increase in temperature causes the flexure 736 to change shape, thereby resulting in a decrease in the exertion of force on the side surfaces 766 of the slider assembly 724. Consequently, the slider assembly 724 flattens out, thereby increasing the distance between the air bearing surface 739 and the storage disk 16 (illustrated in FIG. 1). However, because of the increased temperature, thermal protrusion of the read/write head 752 toward the storage disk 16 occurs which at least partially, if not fully, offsets the flattening of the air bearing surface 739 of the slider assembly 724. In effect, the distance between the read/write head 752 and the storage disk 16 is substantially maintained despite the change between the first temperature and the second temperature.

While the particular slider assembly 24 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
    a rotatable storage disk;
    a suspension; and
    a slider assembly including (i) a trailing half having a surface area and a read/write head that magnetically interacts with the storage disk, and (ii) a leading half having a surface area that is substantially similar to the surface area of the trailing half, wherein the percentage of the surface area of the trailing half that is directly secured to the suspension is greater than the percentage of the surface area of the leading half that is directly secured to the suspension, wherein the slider assembly includes at least two side surfaces that are approximately perpendicular to the storage disk, and wherein the suspension is secured to at least one of the side surfaces.

2. The disk drive of claim 1 wherein the suspension is secured to the slider assembly only on at least two side surfaces of the slider assembly.

3. The disk drive of claim 2 wherein the suspension is secured to the at least two side surfaces only on the trailing half of the slider assembly.

4. The disk drive of claim 1 wherein the slider assembly is secured to the suspension so that a greater degree of concavity occurs in a cross-crown direction than in a crown direction as the temperature of the slider assembly increases.

5. The disk drive of claim 1 wherein the suspension is configured and secured to the slider assembly so that a greater extent of deformation occurs to the trailing half of the slider assembly than to the leading half of the slider assembly based on a change in temperature of the slider assembly.

6. A disk drive comprising:
    a rotatable storage disk;
    a suspension; and
    a slider assembly that is secured to the suspension so that during an increase in temperature of the suspension only a portion of the slider assembly is subjected to a force that causes deformation of the slider assembly along a crown direction of the slider assembly, and further wherein the slider assembly includes at least two side surfaces that are approximately perpendicular to the storage disk, and wherein the suspension is secured to at least one of the side surfaces.

7. The disk drive of claim 6 wherein the suspension is secured to the slider assembly only on at least two side surfaces of the slider assembly.

8. The disk drive of claim 7 wherein the slider assembly includes a trailing half having a read/write head, and a leading half, and wherein the suspension is secured to the at least two side surfaces only on the trailing half of the slider assembly.

9. The disk drive of claim 6 wherein the slider assembly is secured to the suspension so that a portion of the slider assembly cantilevers away from the suspension.

10. The disk drive of claim 6 wherein the slider assembly is secured to the suspension so that a greater degree of concavity occurs in a cross-crown direction than in the crown direction as the temperature of the slider assembly increases.

11. The disk drive of claim 6 wherein the slider assembly includes a trailing half having a read/write head, and a leading half, and wherein the suspension is configured and secured to the slider assembly so that a greater degree of deformation occurs to the trailing half of the slider assembly than to the leading half of the slider assembly based on a change in temperature of the slider assembly.

12. A disk drive comprising:
    a rotatable storage disk;
    a suspension; and a slider assembly that magnetically interacts with the storage disk, the slider assembly being secured to the suspension so that a portion of the slider assembly cantilevers away from the suspension, wherein the slider assembly includes at least two side surfaces that are approximately perpendicular to the storage disk, and wherein the suspension is secured to at least one of the side surfaces.

13. The disk drive of claim 12 wherein the suspension is secured to the slider assembly only on at least two side surfaces of the trailing half of the slider assembly.

14. The disk drive of claim 12 wherein the suspension is configured and secured to the slider assembly so that a greater extent of deformation occurs to the trailing half of the slider assembly than to the leading half of the slider assembly based on a change in temperature of the slider assembly.

15. The disk drive of claim 12 wherein the slider assembly is secured to the suspension so that a greater degree of concavity occurs in a cross-crown direction than in a crown direction as the temperature of the slider assembly increases.

16. A disk drive comprising:
a rotatable storage disk;
a suspension; and
a slider assembly that magnetically interacts with the storage disk, the slider assembly having a first edge and an opposing second edge, the slider assembly being secured to the suspension so that a ten degree Celsius increase in temperature of the suspension causes greater deformation at the first edge than at the second edge.

17. The disk drive of claim 16 wherein the slider assembly includes (i) a trailing half having a surface area and a read/write head that magnetically interacts with the storage disk, and (ii) a leading half having a surface area that is substantially similar to the surface area of the trailing half, wherein the percentage of the surface area of the trailing half that is directly secured to the suspension is greater than the percentage of the surface area of the leading half that is directly secured to the suspension.

18. The disk drive of claim 16 wherein the ten degree Celsius increase in temperature of the suspension causes at least approximately a five percent greater deformation at the first edge than at the second edge.

19. The disk drive of claim 16 wherein the slider assembly is secured to the suspension so that a portion of the slider assembly cantilevers away from the suspension.

20. The disk drive of claim 16 wherein the suspension is secured to the slider assembly along an entire width of the slider assembly.

21. The disk drive of claim 20 wherein the suspension is not secured to the slider assembly along an entire length of the slider assembly.

22. The disk drive of claim 16 wherein the slider assembly is secured to the suspension so that a greater degree of concavity occurs in a cross-crown direction than in a crown direction as the temperature of the slider assembly increases.

23. A method for controlling a head-to-disk spacing in a disk drive, the method comprising the step of: securing a slider assembly having a read/write head to a suspension so that the percentage of a surface area of a trailing half of the slider assembly that is directly secured to the suspension is greater than the percentage of a surface area of a leading half of the slider assembly that is directly secured to the suspension, wherein the step of securing includes securing the slider assembly to the suspension so that a greater degree of concavity occurs in a cross-crown direction than in a crown direction as the temperature of the slider assembly increases.

24. The method of claim 23 further comprising configuring the suspension so that a greater extent of deformation occurs to the trailing half of the slider assembly than to the leading half of the slider assembly based on a change in temperature of the slider assembly.

* * * * *